United States Patent
Kim et al.

(10) Patent No.: US 7,874,530 B2
(45) Date of Patent: Jan. 25, 2011

(54) SUPPORTER USABLE WITH DISPLAY APPARATUS

(75) Inventors: Sun-jin Kim, Suwon-si (KR); Dae-jin Kim, Uiwang-si (KR)

(73) Assignee: Samsung Electronics Co., Ltd, Suwon-si (KR)

( * ) Notice: Subject to any disclaimer, the term of this patent is extended or adjusted under 35 U.S.C. 154(b) by 108 days.

(21) Appl. No.: 12/056,474

(22) Filed: Mar. 27, 2008

(65) Prior Publication Data

US 2008/0237411 A1    Oct. 2, 2008

(30) Foreign Application Priority Data

Apr. 2, 2007    (KR) .................. 10-2007-0032234
Oct. 31, 2007   (KR) .................. 10-2007-0110394

(51) Int. Cl.
*F16M 11/00* (2006.01)
(52) U.S. Cl. .................. 248/176.1; 248/123.11; 248/917
(58) Field of Classification Search ............ 248/917, 248/176.1, 176.3, 157, 161
See application file for complete search history.

(56) References Cited

U.S. PATENT DOCUMENTS

| | | | | |
|---|---|---|---|---|
| 6,712,321 | B1* | 3/2004 | Su et al. ................ | 248/123.11 |
| 7,611,103 | B2* | 11/2009 | Ha et al. ................ | 248/125.2 |
| 2007/0064380 | A1* | 3/2007 | Shin ...................... | 361/681 |
| 2007/0102600 | A1* | 5/2007 | Ishizaki et al. .......... | 248/176.3 |
| 2007/0205340 | A1* | 9/2007 | Jung ..................... | 248/125.9 |
| 2007/0262210 | A1* | 11/2007 | Oh et al. ................ | 248/125.1 |
| 2008/0117574 | A1* | 5/2008 | Lee ....................... | 361/681 |

* cited by examiner

Primary Examiner—Amy J Sterling
(74) Attorney, Agent, or Firm—Stanzione & Kim, LLP

(57) ABSTRACT

A supporter usable with a display apparatus includes a base, a vertical moving member coupled to a display main body, a guide frame coupled to the base to support the vertical moving member to slide up and down, a spring rotor supported in the vertical moving member rotatably having a rotational axis transverse to a moving direction of the vertical moving member to move up and down along with the vertical moving member, a spiral plate spring having an inside end part coupled to the spring rotor as being wound around the spring rotor and an outside end part coupled to the guide frame to elastically resist a downward movement of the vertical moving member, a spring friction part to frictionally contact the spiral plate spring to resist a rotational movement of the spiral plate spring, and a rotor friction part to frictionally contact the spring rotor to resist a rotational movement of the spring rotor.

32 Claims, 9 Drawing Sheets

US 7,874,530 B2

SUPPORTER USABLE WITH DISPLAY APPARATUS

CROSS-REFERENCE TO RELATED APPLICATIONS

This application claims priorities from Korean Patent Applications No. 10-2007-0032234, filed on Apr. 2, 2007 and No. 10-2007-0110394, filed on Oct. 31, 2007 in the Korean Intellectual Property Office, the disclosures of which are incorporated herein by reference in their entirety.

BACKGROUND OF THE INVENTION

1. Field of the Invention

The present general inventive concept relates to a supporter usable with a display apparatus, and more particularly, to a supporter usable with a display apparatus, which has an improved structure to support a display main body.

2. Description of the Related Art

In general, a display apparatus includes a display main body where an image is displayed, and a supporter which has a base or the like seated on an installation surface such as a table and supporting the display main body.

The display main body includes a thin display panel such as a liquid crystal display (LCD), a plasma display panel (PDP), etc.

The supporter for the display apparatus includes a vertical move unit provided between the display main body and the base and allowing a user to freely adjust the height of the display main body with respect to the base.

However, such a conventional supporter for the display apparatus has a problem that friction in the vertical move unit is too small to prevent the display main body from moving down to the installation surface when a small load is added to the display main body.

Further, the conventional supporter has a narrow tolerance for supporting a load involving the display main body, so that it is difficult to change the size and the weight of the display main body. Also, additional components are needed to increase the friction in the vertical move unit, so that manufacturing costs may increase.

SUMMARY OF THE INVENTION

The present general inventive concept provides a supporter usable with a display apparatus, which is capable of stably supporting a display main body even though a load involving the display main body is changed.

The present general inventive concept also provides a supporter usable with a display apparatus, of which tolerance for supporting a load involving a display main body is extended, so that it is easy to change the size and the weight of the display main body.

The present general inventive concept also provides a supporter usable with a display apparatus, in which components needed for increasing a friction in the supporter are minimized in number or shared, thereby reducing manufacturing costs.

Additional aspects and utilities of the present general inventive concept will be set forth in part in the description which follows and, in part, will be obvious from the description, or may be learned by practice of the general inventive concept.

The foregoing and/or other aspects of the present general inventive concept can be achieved by providing a supporter usable with a display apparatus, comprising a base, a vertical moving member coupled to a display main body, a guide frame coupled to the base to support the vertical moving member to slide up and down, a spring rotor supported in the vertical moving member rotatably having a rotational axis transverse to a moving direction of the vertical moving member to move up and down along with the vertical moving member, a spiral plate spring comprising an inside end part coupled to the spring rotor as being wound around the spring rotor and an outside end part coupled to the guide frame to be elastically resistant to a downward movement of the vertical moving member, a spring friction part to frictionally contact the spiral plate spring and to resist a rotational movement of the spiral plate spring, and a rotor friction part to frictionally contact the spring rotor and to resist a rotational movement of the spring rotor.

The spring friction part may be provided in the vertical moving member and having an arc-shaped friction surface to frictionally contact an outer surface of the spiral plate spring.

The rotor friction part may comprise a rotor shaft having a first part coupled to the spring rotor along the rotational axis of the spring rotor and rotatable relative to the spring rotor, and a second part coupled to the vertical moving member and prevented from rotating, and a friction spring interposed between the spring rotor and the rotor shaft and elastically contacting the rotor shaft.

The vertical moving member may comprise a guide part slidably guiding the second part of the rotor shaft to make the spiral plate spring contact the spring friction part.

The second part of the rotor shaft may comprise a sliding projection protruding from the first part of the rotor shaft and slidably coupled to the guide part, and the guide part is lengthwise formed on an inner surface of the vertical moving member along a moving direction of the rotor shaft and accommodates and guides the sliding projection to move up and down.

The friction may caused by at least one of the spring friction part and the rotor friction part is in a range of 0.2 kgf through 0.3 kgf when the vertical moving member moves up and down.

Elasticity of the spiral plate spring may be in a range of 1 kgf through 7 kgf.

The foregoing and/or other aspects of the present invention can also be achieved by providing a supporter for a display apparatus, comprising a base, a vertical move supporting unit provided between a display main body and the base to support the display main body to slide up and down with respect to the base, a spiral plate spring to elastically bias the display main body to move up with respect to the base, a spring rotor coupled to an inside of the spiral plate spring and winding the spiral plate spring therearound, and a spring supporter to support the spiral plate spring and the spring rotor and to be detachably coupled to the vertical move supporting unit.

The vertical move supporting unit may comprise a vertical moving member having a first side coupled to the display main body and a second side detachably coupled with the spring supporter, and a guide frame coupled to the base and supporting the vertical moving member to slide up and down.

The vertical moving member may include metal, and the spring supporter may include plastics.

The supporter may further comprise a rotor friction part to frictionally contact the spring rotor and resisting rotation of the spring rotor.

The rotor friction part may comprise a rotor shaft having a first part coupled to the spring rotor along a rotational axis of the spring rotor and rotatable relative to the spring rotor, and a second part coupled to the vertical moving member and prevented from rotating, and a friction spring interposed between the spring rotor and the rotor shaft and elastically contacting the rotor shaft.

The spring supporter may comprise a guide part slidably guiding the second part of the rotor shaft to make the spiral plate spring contact the spring supporter.

The second part of the rotor shaft may comprise a sliding projection protruding from the first part of the rotor shaft and slidably coupled to the guide part, and the guide part is lengthwise formed on an inner surface of the vertical moving member along a moving direction of the rotor shaft and accommodates and guides the sliding projection to move up and down.

The friction may caused by the rotor friction part is in a range of 0.2 kgf through 0.3 kgf.

The supporter may further comprise a spring friction part to frictionally contact the spiral plate spring and to resist a rotational movement of the spiral plate spring.

The spring friction part may be provided in the spring supporter and having an arc-shaped friction surface to frictionally contact an outer surface of the spiral plate spring.

The friction may caused by the spring friction part is in a range of 0.2 kgf through 0.3 kgf.

The spring supporter selectively may support at least three spiral plate springs.

The spring supporter may comprise a lower spring supporter provided in a lower region of the vertical move supporting unit and supporting the pair of spiral plate springs, and an upper spring supporter placed over the lower spring supporter and supporting the pair of spiral plate springs.

The supporter may further comprise a spring friction part to frictionally contact the spiral plate spring and to resist rotational movement of the spiral plate spring.

The spring friction part may be provided in the spring supporter and having an arc-shaped friction surface to frictionally contact an outer surface of the spiral plate spring.

The foregoing and/or other aspects of the present invention can also be achieved by providing a supporter usable with a display apparatus, including a base, a vertical moving member coupled to a display main body, a guide frame coupled to the base to support the vertical moving member to move with respect to the base, and an elastic unit connected between the vertical moving member and the guide frame, and having elasticity and friction to maintain a position of the display main body with respect to the base, wherein the friction may occur at multiple frictional areas on the elastic unit.

The elastic unit may include a spring including an inside end part and an outside end part coupled to the guide frame, and having the elasticity, and a spring rotor supported in the vertical moving member and coupled to the inside end part to rotate about a rotational axis transverse to a moving direction of the vertical moving member and to move up and down along with the vertical moving member with respect to the base, and having one of the one or more frictional areas.

The elastic unit may include a spring friction part to generate friction with the spring to resist a rotational movement of the spiral plate spring, and a rotor friction part to generate friction at the one of the one or more frictional areas with the spring rotor to resist a rotational movement of the spring rotor.

The elastic unit may include a spring including an inside end part and an outside end part coupled to the guide frame and the vertical moving member, respectively, and having the elasticity, a spring rotor coupled to an inside of the spiral plate spring such that the spiral plate spring is wound around the spring rotor, and a spring supporter formed on the vertical move supporting unit to support the spiral plate spring and the spring rotor and detachably coupled to the vertical move supporting unit.

The vertical moving member may include a first number of friction parts, and the elastic unit may include a second number of springs to be coupled between the guide frame and a corresponding one of the friction parts, so that friction is generated.

The friction parts may be different from each other in size or shape.

The springs may be different from each other in elasticity.

The springs may be different from each other in friction with the vertical moving member.

The foregoing and/or other aspects of the present invention can also be achieved by providing a supporter usable with a display apparatus, including a base, a vertical moving member coupled to a display main body and having a first number of friction parts, a guide frame coupled to the base to support the vertical moving member to move with respect to the base, and an elastic unit connected between the vertical moving member and the guide frame, having elasticity and one or more frictions to maintain a position of the display main body with respect to the base, and having a second number of springs having elasticity and to be coupled between the guide frame and a corresponding one of the friction parts to generate the one or more fictions, wherein the first number is greater than the second number.

The foregoing and/or other aspects of the present invention can also be achieved by providing a supporter usable with a display apparatus, including a base, a vertical moving member coupled to a display main body and having a plurality of friction parts, a guide frame coupled to the base to support the vertical moving member to move with respect to the base, and an elastic unit connected between the vertical moving member and the guide frame, having elasticity and one or more frictions to maintain a position of the display main body with respect to the base, and having a plurality of springs having elasticity and to be coupled between the guide frame and a corresponding one of the friction parts to generate one or more fictions, wherein the at least one of the springs is different in elasticity from the other one of the springs.

BRIEF DESCRIPTION OF THE DRAWINGS

The above and/or other aspects of the present general inventive concept will become apparent and more readily appreciated from the following description of the exemplary embodiments, taken in conjunction with the accompanying drawings, in which.

DETAILED DESCRIPTION OF THE PREFERRED EMBODIMENTS

Figure 1:
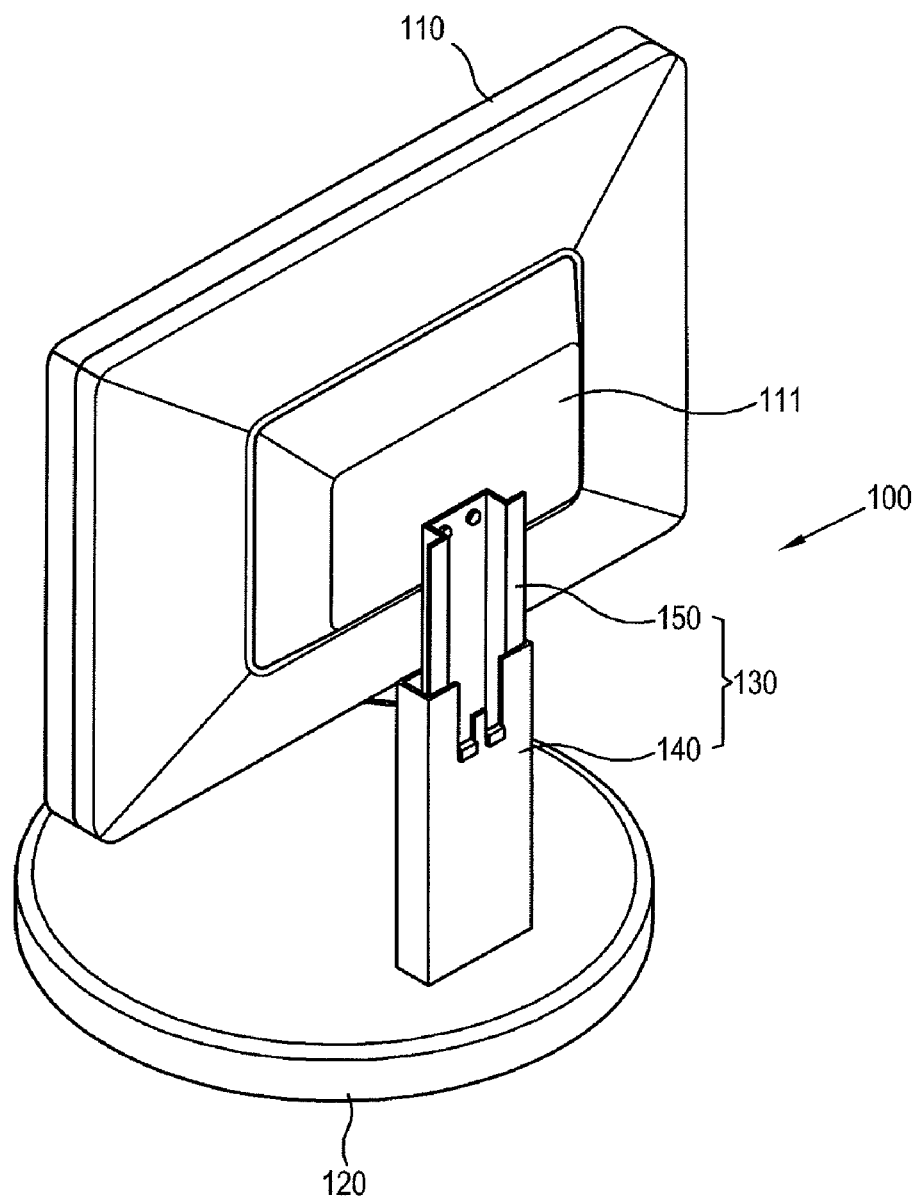
FIG. 1 is a perspective view illustrating a supporter usable with a display apparatus according to an exemplary embodiment of the present genera inventive concept.

Reference will now be made in detail to the embodiments of the present general inventive concept, examples of which are illustrated in the accompanying drawings, wherein like reference numerals refer to like elements throughout. The embodiments are described below so as to explain the present general inventive concept by referring to the figures.

As illustrated in FIG. 1, a display apparatus according to an exemplary embodiment of the present general inventive concept includes a display main body 110 to form an image thereon, and a supporter 100 to support the display main body 110. The supporter 100 includes a base 120 seated on an insulation surface, and a vertical move supporting unit 130 provided between the display main body 110 and the base 120 and supporting the display main body 110 to move up and down with respect to the base 120.

According to an exemplary embodiment of the present general inventive concept, the supporter 100 may include at least one of a tilting unit provided between the display main body 110 and the vertical move supporting unit 130 and allowing the display main body 110 to tilt with respect to a left-and-right directional axis of the base 120, a pivoting unit provided between the display main body 110 and the tilting unit and allowing the display main body 110 to pivot with respect to a front-and-back directional axis of the base 120, and a swiveling unit coupled to the base 120 and allowing the display main body 110 to swivel with respect to an up-and-down directional axis of the base 120.

The display main body 110 may include a thin display panel such as a liquid crystal display (LCD) or a plasma display panel (PDP) to form an image thereon. Alternatively, the display main body 110 may include other display panels such as a cathode ray tube (CRT) or the like. The display main body 110 according to an exemplary embodiment of the present invention may be applied to various information technology (IT) devices such as a computer and various video multimedia devices such as a television.

The vertical move supporting unit 130 includes a guide frame 140 and a vertical moving member 150. The guide frame 140 is mounted on the base 120 to guide the vertical moving member 150, and the vertical moving member 150 is coupled to the display main body 110.

Figure 2:
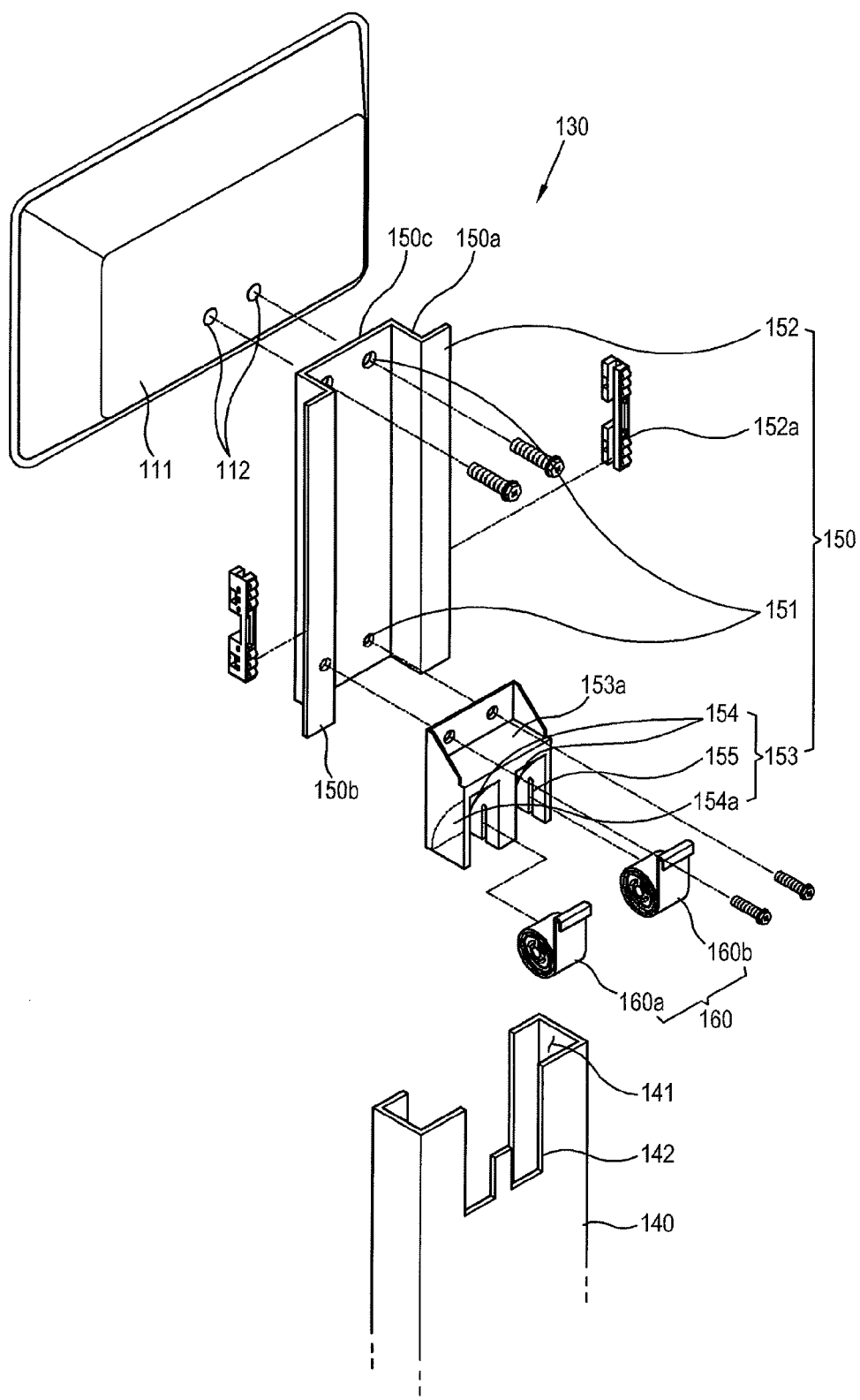
FIG. 2 is an exploded perspective view illustrating the supporter usable with a display apparatus of FIG. 1.

Referring to FIG. 2, a plurality of coupling holes 112 may be provided on a back side 111 of the display main body 110, and a plurality of coupling holes 151 are provided on a plate 150c of the vertical moving member 150 at upper and lower portions 150a and 150b thereof so that the display main body 110 can be coupled to the vertical moving member 150 by coupling screws to the plate 150c and the back side of 111 of the display main body 110 through the coupling holes 112 and 151. Here, the coupling holes 112 may be formed based on video electronic standard association (VESA). Accordingly, another stand according to the VESA may be coupled to the coupling holes 112 of the display main body 110.

Referring back to FIG. 1, the base 120 is shaped like a plate to be seated on the installation surface such as a table. The base 120 couples with the guide frame 140 of the vertical move supporting unit 130, thereby supporting the vertical moving member 150 or the like. Here, it is preferable but not indispensable that the installation surface on which the base 120 is seated is horizontal, but not limited thereto. Alternatively, the installation surface may be an inclined surface including a wall.

Figure 3:
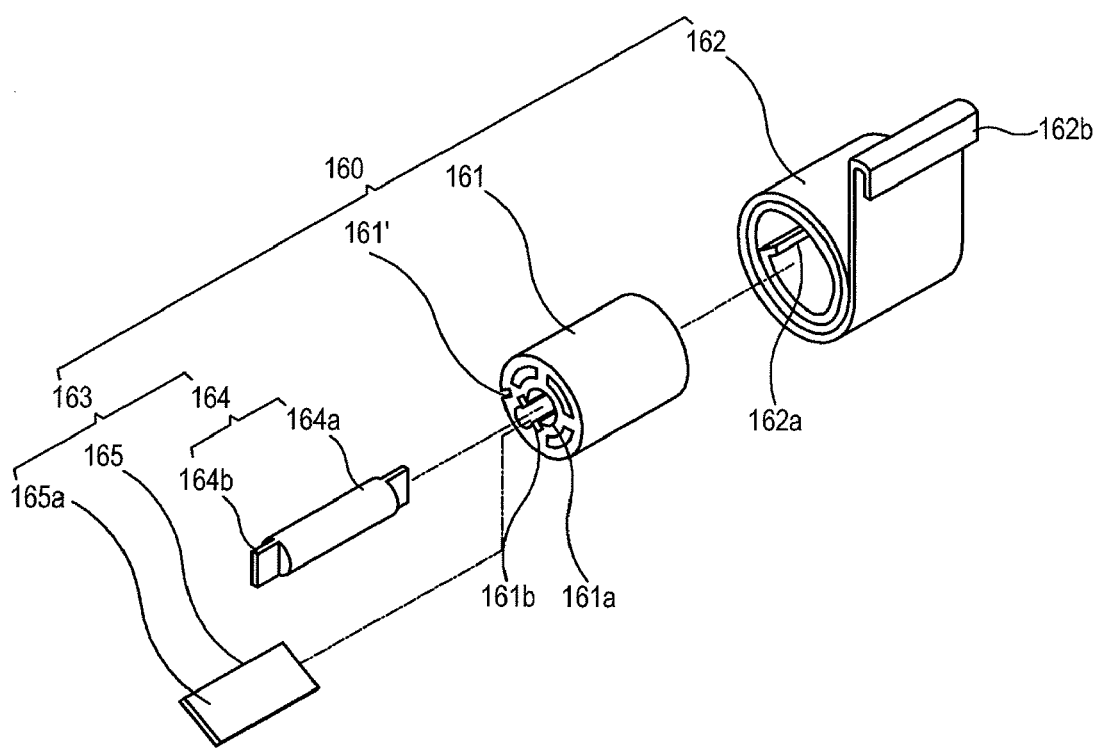
FIG. 3 is an enlarged perspective view illustrating an elastic unit of the supporter of FIG. 2.

As illustrated in FIGS. 2 and 3, the vertical move supporting unit 130 includes the guide frame 140 coupled to the base 120 and having a vertical move guiding part 141, the vertical moving member 150 coupled to the display main body 110 and guided to move up and down by the vertical move guiding part 141, and an elastic unit 160 provided between the guide frame 140 and the vertical moving member 150.

As illustrated in FIGS. 1 and 2, the guide frame 140 is coupled to the base 120 uprightly. The guide frame 140 includes the vertical move guiding part 141 to accommodate the vertical moving member 150 and the elastic unit 160 therein to guide the vertical moving member 150 to move up and down with respect to the base 120 and the guide frame 140.

According to an exemplary embodiment of the present general inventive concept, a screw can be used to couple the guide frame 140 with the base 120, but not limited thereto. Alternatively, welding or other known methods may be used to couple the guide frame 140 with the base 120. Further, the guide frame 140 and the base 120 may be formed as a single body.

The vertical moving member 150, as illustrated in FIGS. 1 and 2, includes an upper part to be fastened to the display main body 110, and a lower part to be accommodated in the vertical move guiding part 141 of the guide frame 140 along the vertical moving direction. The vertical moving member 150 includes the coupling hole 151 formed on the plate 150c thereof to be fastened to the display main body 110, and a vertical moving rail 152 bent and extended from opposite sides of the plate 150c to sliding-contact an inner surface of the guide frame 140. Further, a spring supporter 153 is detachably attached to the lower part of the vertical moving member 150. According to an exemplary embodiment of the present general inventive concept, the vertical moving member 150 is made of a metal plate, but the present general inventive concept is not limited thereto. Alternatively, various materials may be applied to the vertical moving member 150.

In the present embodiment, the vertical moving member 150 is screw-fastened to the display main body 110, but the present general inventive concept is not limited thereto. Alternatively, the vertical moving member 150 and the display main body 110 may be coupled by other known methods in the art. For example, the vertical moving member 150 and the display main body 110 may be formed as a single body.

The spring supporter 153 is detachably coupled to the vertical move supporting unit 130. In the present embodiment, the spring supporter 153 is detachably screw-fastened to a lower side of the vertical moving member 150, but the present general inventive concept is not limited thereto. Alternatively, the spring supporter 153 may be coupled to the vertical moving member 150 by other known methods in the art. For example, the spring supporter 153 may be formed integrally with the vertical moving member 150. Further, the spring supporter 153 is made of plastics, but not limited thereto. Alternatively, the spring supporter 153 may be made of various materials.

The spring supporter 153 may include a supporter body 153a and one or more spring friction parts 154 formed on the supporter body 153a. Each of the one or more spring friction parts 154 may include one or more side surface guide part 155 and one or more inner surfaces 154a. The spring friction parts 154 may be a receiving portion form in the supporter body 153a to receive a corresponding elastic unit 160

The coupling hole 151, as illustrated in FIG. 2, may be bored through the vertical moving member 150 at positions to be coupled with the display main body 110 and the spring supporter 153.

The vertical moving rail 152, as illustrated in FIG. 2, may be provided with a sliding bearing 152a disposed between the guide frame 140 and the vertical moving member 150 to reduce a frictional resistance while being in sliding-contact with an inner surface of the guide frame 140. In this embodiment, the sliding bearing 152a is coupled to the vertical moving rail 152 so that the sliding bearing 152a can be in sliding-contact with the vertical moving rail 152 and the inner surface of the guide frame 140.

The elastic unit 160, as illustrated in FIGS. 2 and 3, includes a spring rotor 161 having a rotational axis transverse to a moving direction of the vertical moving member 150 and rotatably supported in the spring supporter 153 of the vertical moving member 150, and a spiral plate spring 162 that has an inside end part 162a coupled to the spring rotor 161 as being wound around the spring rotor 161 and an outside end part 162b coupled to the guide frame 140 to elastically resist a downward movement of the vertical moving member 150. Further, the elastic unit 160 is provided with a rotor friction part 163 to frictionally contact the spring rotor 161 to resist a rotational movement of the spring rotor 161.

The elastic unit 160 may include one or more elastic units 160a and 160b to be disposed in corresponding ones of the one or more spring friction parts 154. It is possible that a first number of the one or more spring friction parts 154 are provided in the supporter body 153a of the spring supporter 153, and that a second number of the one or more elastic units 160a and 160b are provided as the elastic unit 160. The first number may be equal to or greater than the second number.

According to an exemplary embodiment, the elastic unit 160 may be achieved by integrate the spring rotor 161, the spiral plate spring 162, and the rotor friction part 163 into a single unit.

The spring rotor 161 has a cylindrical shape around which the spiral plate spring 162 is wound. The spring rotor 161 together with the spiral plate spring 162 elastically urges the vertical moving member 150 to move upward depending on the elasticity of the spiral plate spring 162, and moves up and down along with the vertical moving member 150. As shown in FIG. 3, the spring rotor 161 includes a shaft accommodating part 161a bored along the rotational axis to accommodate a rotor shaft 164 (to be described later), and a friction spring accommodating part 161b formed in the shaft accommodating part 161a to accommodate a friction spring 165 (to be described later).

The inside end part 162a of the spiral plate spring 162 is bent to be coupled to an outer circumferential surface of the spring rotor 161, thereby rotating along with the spring rotor 161. The spiral rotor 161 may have a slot 161' to be coupled to the inside end part 162a. The outside end part 162b of the spiral plate spring 162 is bent and coupled to a plate spring coupling part 142 of the guide frame 140.

The spiral plate spring 162 is that a plate spring having a predetermined width is wound around the spring rotor 161. The width of the spiral plate spring 162 may vary according to the weight or the like of the display main body 110. For example, if the weight of the display main body 110 approximates 4 kgf and the spiral plate spring 162 is provided in a pair, each spiral plate spring 162 may have an elasticity of about 2 kgf. In this case, the width of the spiral plate spring 162 is determined to have the elasticity of about 2 kgf. However, the elasticity of the spiral plate spring 162 is not limited to the foregoing example, and may be in a range of 1 kgf through 7 kgf, etc.

The rotor friction part 163, as illustrated in FIG. 3, includes the rotor shaft 164 rotatably coupled to the spring rotor 161 in the rotational axis of the spring rotor 161, and the friction spring 165 interposed between the spring rotor 161 and the rotor shaft 164 to elastically contact the rotor shaft 164.

For instance, a friction of about 0.2 kgf through 0.3 kgf is generated in the rotor friction part 163 when the vertical moving member 150 moves up and down. If the friction generated in the rotor friction part 163 is too small, the vertical moving member 150 can easily move with respect to the guide frame 140. On the other hand, if the friction generated in the rotor friction part 163 is too great, the spiral plate spring 162 does not smoothly rotate when the vertical moving member 150 moves up and down. Accordingly, the friction generated in the rotor friction part 163 may be in a range of about 0.2 kgf through 0.3 kgf when the vertical moving member 150 moves up and down. However, the friction generated in the rotor friction part 163 is not limited to the foregoing example. Alternatively, the friction generated in the rotor friction part 163 may be lower than about 0.2 kgf or higher than 0.3 kgf.

Referring to FIG. 3, the rotor shaft 164 includes a first part 164a coupled to the spring rotor 161 in the rotational axis of the spring rotor 161 and rotatable relative to the spring rotor 161, and a second part 164b coupled to the spring supporter 153 of the vertical moving member 150 and prevented from rotating with respect to the spring supporter 153. In this embodiment, the first part 164a is provided as a middle part of the rotor shaft 164, which is accommodated in the shaft accommodating part 161a of the spring rotor 161, and the second part 164b may be a sliding projection protruding from the first part 164a of the rotor shaft 164 and sliding-coupled to a guide part 155 of the spring supporter 153.

The sliding projection 164b has a non-circular cross-section so that it cannot rotate while being accommodated in the guide part 155. In this embodiment, the sliding projection 164b has a rectangular cross-section, but not limited thereto. Alternatively, the sliding projection 164b may have various non-circular cross-sections.

The friction spring 165 according to an exemplary embodiment of the present embodiment is made of an elastic material and shaped like a plate (refer to FIG. 3). The friction spring 165 is accommodated in the friction spring accommodating part 161b and rotates along with the spring rotor 161. The friction spring 165 has a rotor frictional surface 615a which is in contact with the rotor shaft 164 and causes a friction between the rotor shaft 164 and the spring rotor 161 rotating along with the spiral plate spring 162. The friction spring 165 is inserted in the spring rotor 161 so that the rotor frictional surface 165a can press the rotor shaft 164 with a predetermined force. Thus, the friction is generated between the rotor shaft 164 and the friction spring 165 when the spring rotor 161 rotates as the vertical moving member 150 moves up or down. However, the friction spring 165 is not limited to the foregoing description, and may be achieved by various elastic members such as a coil spring and the like.

Accordingly, in the supporter 100 for the display apparatus according to the exemplary embodiment of the present general inventive concept, the rotor friction part 163 increases the friction when the vertical moving member 150 moves up and down.

The spring supporter 153, as illustrating in FIG. 2, includes the spring friction part 154 to contact an outer surface of the spiral plate spring 162, and the guide part 155 to guide the rotor shaft 164 to move up and down within a predetermined range. According to the exemplary embodiment of the present general inventive concept, the spring supporter 153 is provided to support the pair of spiral plate spring 162.

The spring friction part 154 having the guide part 155 may be formed on the supporter body of the spring supporter 153 such that at least a portion of the elastic unit 160 is rotatably supported in the spring friction 154.

According to an exemplary embodiment of the present general inventive concept, the spring friction part 154 includes the spring friction surface 154a which is formed as an arc shape on the inner surface of the spring supporter 153 to be in contact with the outer surface of the spiral plate spring 162. Thus, while the spring rotor 161 rotates as the vertical moving member 150 moves up or down, a friction is generated between the spring friction surface 154a and the outer surface of the spiral plate spring 162. However, the spring friction part 154 is not limited to the above description, and may have various shapes such as a projection or the like so as to frictionally contact the outer surface of the spiral plate spring 162.

It is possible that when the spiral spring 162 rotates, that is, when the inside end part 162a rotates with respect to the outside end part 162b, the vertical moving member 150 moves up and down with respect to the guide frame, and a diameter of the spiral spring 162 may increase or decrease such that a friction is generated between the spiral spring 162 and the inner surfaces 154a.

For example, like the rotor friction part 163, the spring friction part 154 causes a friction of about 0.2 kgf through 0.3 kgf when the vertical moving member 150 moves up and down. The friction caused by the spring friction part 154 is similar to that caused by the rotor friction part 163, and thus its detailed description will be omitted. Accordingly, the present invention proposes that the friction generated in the spring friction part 154 be in a range when the vertical moving member 150 moves up and down. However, the friction generated in the spring friction part 154 is not limited to the foregoing example. Alternatively, the friction generated in the spring friction part 154 may be lower than about 0.2 kgf or higher than 0.3 kgf.

One or more guide parts 155 may be formed on inner and/or side surfaces of the spring supporter 153 to be in contact with corresponding ones of opposite edges of the rotor shaft 164. For example, the guide part 155 may be a groove formed on the inner and/or side surface of the spring supporter 153 along the moving direction of the rotor shaft 164 so that the guide part 155 can accommodate and guide the sliding projection 164b of the rotor shaft 164 to move up and down in the moving direction of the rotor shaft 164. Accordingly, even though the spiral plate spring 162 changes in a diameter as the vertical moving member 150 moves up and down, the rotor shaft 164 moves without deviating from the guide part 155, so that the spring friction part 154 can be maintained to be in contact with the outer surface of the spiral plate spring 162 (refer to FIGS. 4 and 5).

Alternatively, the guide part 155 may have various shapes to serve as another friction unit to generate a friction between the guide part 155 and the sliding projection 164b.

Accordingly, in the supporter 100 for the display apparatus according to the exemplary embodiment of the present general inventive concept, the spring friction part 154 additionally increases the friction when the vertical moving member 150 moves up and down.

Also, the friction against the vertical movement of the vertical moving member 150 can be doubled between the rotor friction part 163 and the spring friction part 154, so that the display main body 110 can be stably supported even if the weight of the display main body 110 increases. When the rotor friction part 163 and the spring friction part 154 increase the friction against the vertical movement of the vertical moving member 150, the number of components constituting the vertical move supporting unit 130 can be minimized, thereby reducing manufacturing costs.

Further, the spring supporter 153 is detachably coupled to the vertical move supporting unit 130, so that the spring supporter 153, which is capable of supporting the size and the number of the spiral plate springs 162 varying according to the size of the display main body 110, can be selectively mounted to the vertical move supporting unit 130.

As described above, the spring supporter 153 may include the first number of the spring friction parts 154, and the elastic unit 160 may include the second number of spring supporters, for example, 160a and 160b. According to a weight of the display main body 110 and a friction of the elastic unit 160 with the vertical moving member 150, the second number of the spring supporters 160a and 160b and the first number of the spring friction parts 154 may vary to correspond to the weight and the friction to allow the vertical moving member 150 to move up and down in a moving state and to maintain the vertical moving member 150 in a stationary state after moving in the moving state. For example, the first number may be two, and the second number may be one or two. That is, when two of the spring friction parts 154 may be provided in the supporter body 153a of the spring supporter 153, a single elastic unit 160 is disposed in one of the two spring friction parts 154. It is also possible that the two elastic units 160 may be disposed in corresponding ones of the two spring friction parts 154.

According to the present general inventive concept, it is also possible that a plurality of the elastic units 160 (160a, 160b) may be different from each other in size, elasticity, and/or friction with the vertical moving member 150. It is also possible that a plurality of spring friction parts 154 may be different from each other in size and shape to correspond to the different elastic units 160 such that the vertical moving member 150 can be in the moving state and maintained in the stationary state.

Figure 4:
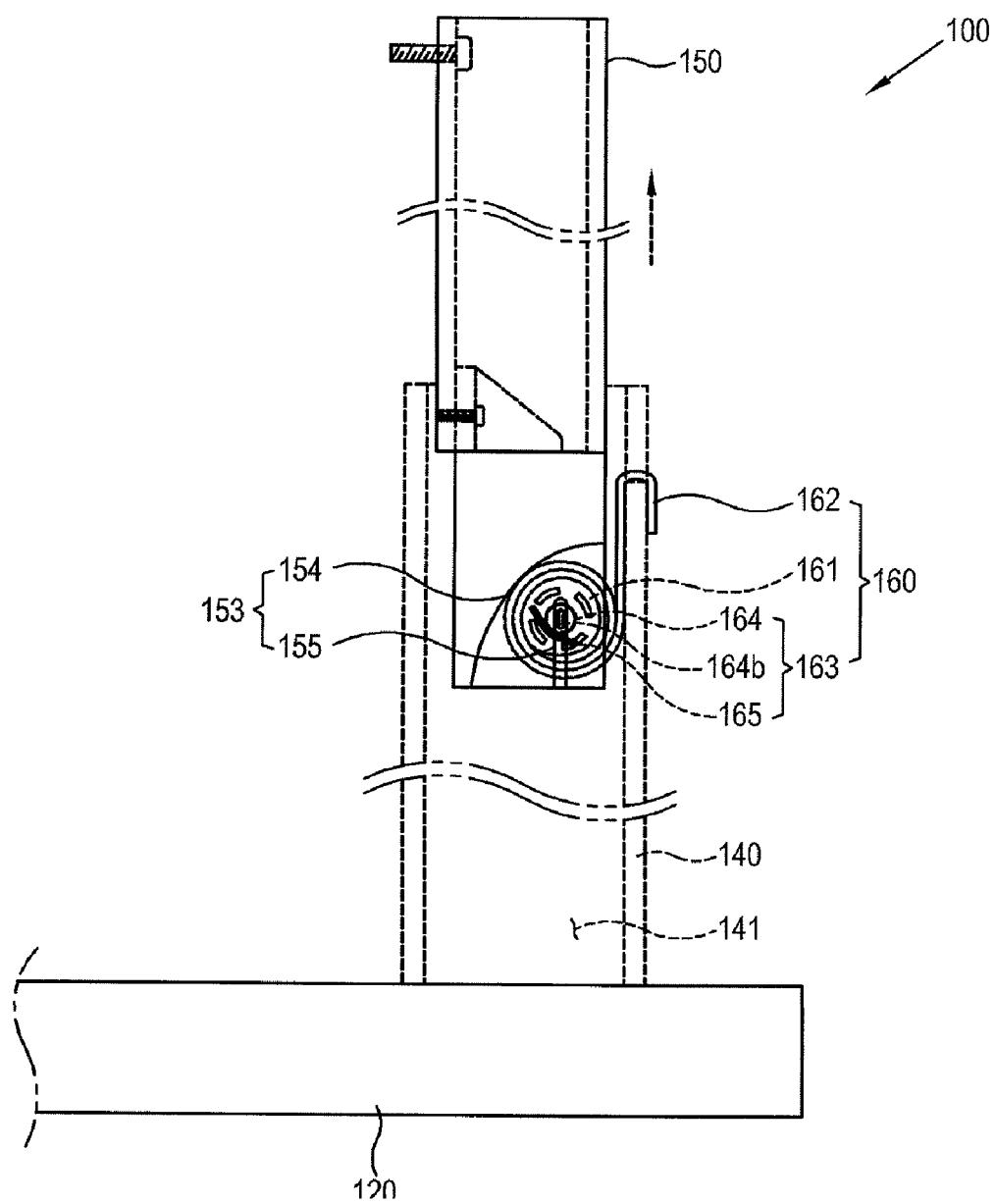
FIG. 4 is a cross-sectional view illustrating a moving up state of a vertical move unit of the supporter usable with the display apparatus of FIGS. 1-3.

With the above-described configuration, operations of the vertical move supporting unit 130 according to an exemplary embodiment of the present general inventive concept will be described below with reference to FIGS. 4 and 5.

Referring to FIGS. 1-5, a user presses the display main body 110 in a downward direction with a force strong enough to overcome at least one of the elasticity and the friction of the spiral plate spring 162. For instance, if the weight of the display main body 110 is approximately equal to the elasticity of the spiral plate spring 162, a user needs a force strong enough to overcome the friction.

Here, the elasticity of the spiral plate spring 162 is its own elasticity, and the friction of the spiral plate spring 162 may occur in multiple frictional areas between the spiral plate spring 162 and the spring supporter 153 and/or in multiple frictional areas between the rotating shaft 164 and the friction spring 165.

Figure 5:
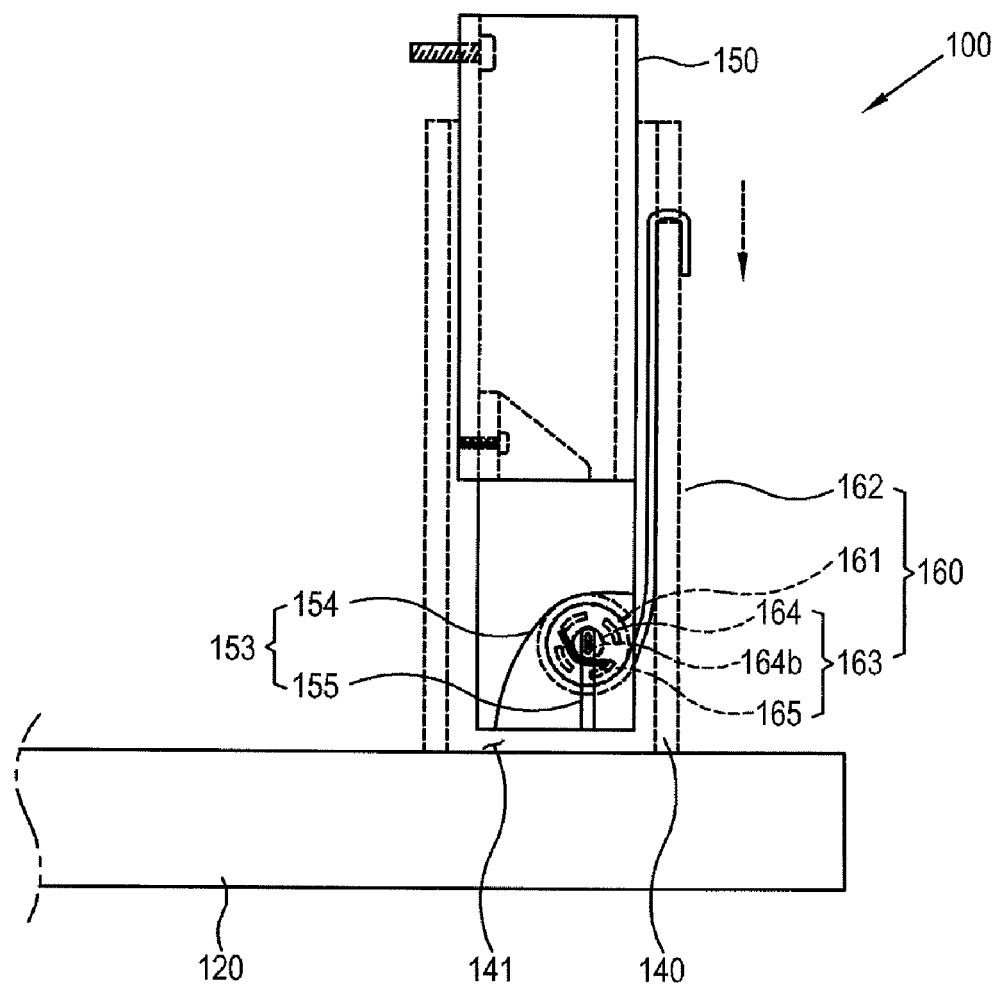
FIG. 5 is a cross-sectional view illustrating a moving down state of the vertical move unit of the supporter usable with the display apparatus of FIGS. 1-3.

Then, the spiral plate spring 162 of the vertical move supporting unit 130 supporting the display main body 110 cannot support the pressed load and is unwound such that the display main body 110 moves down toward the base 120 (refer to FIG. 5). At this time, the spring rotor 161, around which the spiral plate spring 162 is wound, rotates and moves down toward a lower part of the guide frame 140. At the same time, the friction is generated between the friction spring 165 and the rotor shaft 164 of the rotor friction part 163 as the spring rotor 161 rotates. The sliding projection 164b of the rotor shaft 164 moves up from a middle position to an upper position of the guide part 155, and the diameter of the spiral plate spring 162 decreases while maintaining the contact between the outer surface of the spiral plate spring 162 and the rotor friction surface 154a of the spring friction part 154. Thus, the friction is generated between the spring friction part 154 and the outer surface of the spiral plate spring 162.

Accordingly, when a force by the user is released from the display main body 110, in a moving down state, the weight of the display main body 110 and the friction maintains the vertical moving member 150 in the moving down state without any further moving downing as it is guided by the vertical move guiding part 141 of the guide frame 140 and moved down (refer to FIG. 5).

On the other hand, a user presses the display main body 110 in an upward direction. Here, a user needs a force strong enough to overcome the friction if the weight of the display main body 110 is approximately equal to the elasticity of the spiral plate spring 162. Then, the spiral plate spring 162 cannot support the pressed load and is elastically restored and rewound (refer to FIG. 4). At this time, the spring rotor 161, around which the spiral plate spring 162 is wound and rotates such that the display main body 110 moves up along the upward moving direction of the vertical moving member 150.

At the same time, the friction is generated between the friction spring 165 and the rotor shaft 164 of the rotor friction part 163 as the spring rotor 161 rotates. The sliding projection 164b of the rotor shaft 164 moves up from the upper position to the middle position of the guide part 155, and the diameter of the spiral plate spring 162 increases while maintaining the contact between the outer surface of the spiral plate spring 162 and the rotor friction surface 154a of the spring friction part 154. Thus, the friction is generated between the spring friction part 154 and the outer surface of the spiral plate spring 162.

Accordingly, although a force by the user is released from the display main body 110, the weight of the display main body 110 and the friction maintains the vertical moving member 150 in a moving up state as it is guided by the vertical move guiding part 141 of the guide frame 140 and moved up (refer to FIG. 5).

Figure 6:
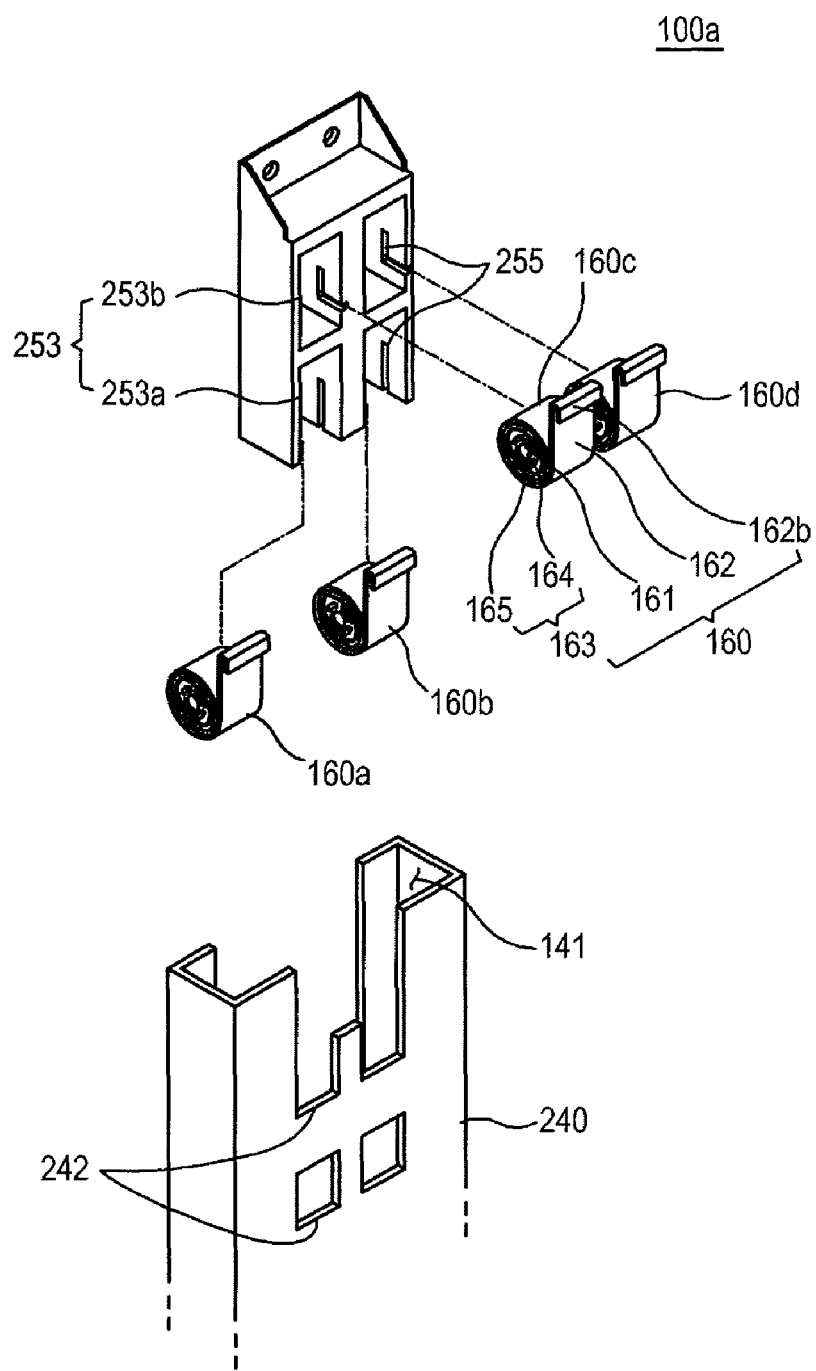
FIG. 6 is a perspective view illustrating an elastic unit and a spring supporting unit in a supporter usable with the display apparatus according to an exemplary embodiment of the present general inventive concept.
Figure 7:
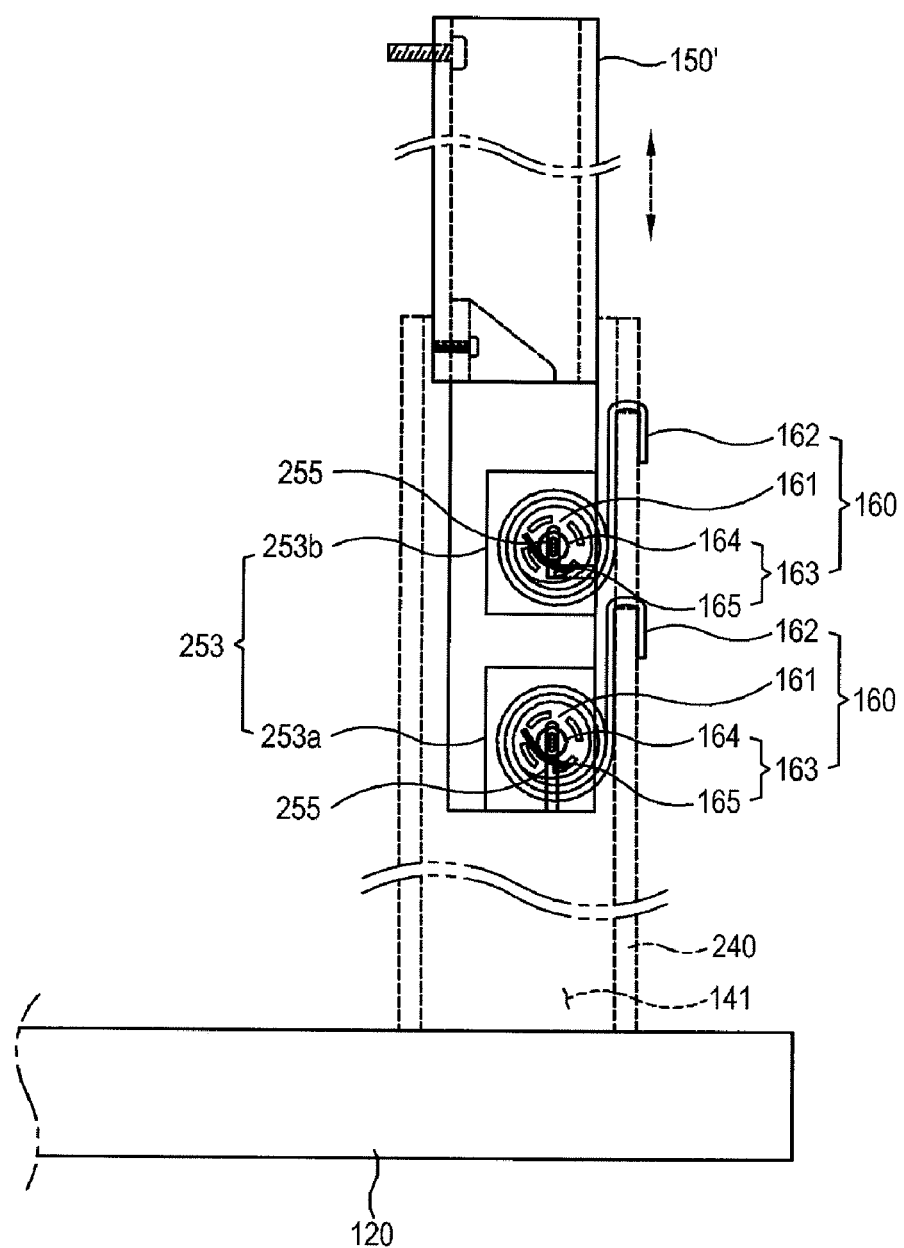
FIG. 7 is a cross-sectional view illustrating a moving up and down state of a vertical move unit of the supporter usable with the display apparatus of FIG. 6.

FIG. 6 is a perspective view illustrating an elastic unit 160 and a spring supporter 253 in a supporter 100a usable with a display apparatus according to an exemplary embodiment of the present general inventive concept, and FIG. 7 is a cross-sectional view illustrating a moving up and down state of a vertical moving member 150' of the supporter 100a usable with the display apparatus of FIG. 6.

Referring to FIGS. 6 and 7, the supporter 100a usable with the display apparatus according to the present embodiment is similar to that of the embodiment of FIGS. 1-5. However, the supporter 100a includes at least three spiral plate springs 162 to be selectively supported in the spring supporter 253 compared to the embodiment of FIGS. 1-5, and does not include the spring friction part 154 of the embodiment of FIGS. 1-5.

The supporter 100a usable with the display apparatus according to the exemplary embodiment of the present general inventive concept will be described mainly about the difference from the embodiment of FIGS. 1-5, and repetitive descriptions will be avoided as necessary.

The spring supporter 253 includes a lower spring supporter 253a provided in a lower region of the vertical moving member 150' and capable of supporting a pair of spiral plate springs 162, and an upper spring supporter 253b placed in an upper region of the vertical moving member 150' above the lower spring supporter 253a and capable of supporting the pair of spiral plate springs 162. According to the present embodiment, the spring supporter 253 is provided for selectively supporting four spiral plate springs 162. In other words, the spring supporter 253 may support one spiral plate spring 162 or two, three or four spiral plate springs 162. However, the spring supporter 253 is not limited to the above description, and may be provided for selectively supporting three spiral plate springs 162 or selectively supporting five or more spiral plate springs 162.

Like the spring supporter 153 of the embodiment of FIGS. 1-5, the lower spring supporter 253a is provided for supporting the pair of spiral plate springs 162. Further, the lower spring supporter 253a includes the same configuration as the rotor friction part 163 of the embodiment of FIGS. 1-5, but may not include a configuration such as the spring friction part 154.

Likewise, the upper spring supporter 253b is also provided to support the pair of spiral plate springs 162. The upper spring supporter 253b includes the same configuration as the rotor friction part 163 of the embodiment of FIGS. 1-5, but may not include a configuration such as the spring friction part 154. Further, the upper spring supporter 253b includes a guide part 255 formed with a groove to receive a rotor shaft 164. The guide part 255 may have a first groove formed in a vertical direction and a second groove extended and bent from the first groove in a frontward direction of the spring supporter 253, to thereby easily receiving the rotor shaft 164. FIG. 6 illustrates the guide part 255 having the first groove formed in an inner surface of the spring supporter 253 to receive the rotor shaft 164, but the present general inventive concept is not limited thereto. Alternatively, the guide part 255 may be formed by perforating the inner surface of the spring supporter 253.

Each of the lower spring supporter 253a and the upper spring supporter 253b is provided for supporting two spiral plate springs 162. In this case, at least one spiral plate spring 162 is mounted to at least one of the lower spring supporter 253a and the upper spring supporter 253b. For example, one spiral plate spring 162 may be mounted to either of the lower spring supporter 253a or the upper spring supporter 253b.

According to the present embodiment, a guide frame 240 includes at least two of three plate spring coupling parts 242 to be coupled with outside end parts 162b of at least three spiral plate springs 162. For example, the guide frame 240 may include two pairs of plate spring coupling parts 242 to be coupled with the outer end parts 162b of four spiral plate springs 162 supported in the lower and upper spring supporters 253a and 253b. Two pairs of plate spring coupling parts 242 are spaced apart from each other in a vertical direction.

With the above described configuration, the supporter 100a usable with the display apparatus according to the exemplary embodiment of the present general inventive concept is configured to use three or more spiral plate springs 162. Compared to the supporter 100 the embodiment of FIGS. 1-5 using one pair of spiral plate springs 162, the supporter 100a according to the present embodiment may support more various sizes or weights of the display main body 110. When each spiral plate spring 162 has an elasticity of about 2 kgf and each rotor friction part 163 has a friction of about 0.25 kgf, if one spiral plate spring 162 is mounted to the spring supporter 253, the supporter 100a usable with the display apparatus is capable of supporting the display main body 110 having a weight of about 1.75 kgf through 2.25 kgf. Under the same condition, if four spiral plate springs 162 are mounted to the spring supporter 253, the total elasticity of four spiral plate springs 162 is about 8 kgf and the total friction of the rotor friction part 163 is about 1 kgf, so that the supporter 100*a* usable with the display apparatus is capable of supporting the display main body 110 having a weight of about 7 kgf through 9 kgf. As the number of spiral plate springs 162 supported in the spring supporter 253 is changeable in a range of 1 through 4, the weight of the display main body 110 to be supported may be changeable in a range of about 1.75 kgf through 9 kgf.

Further, the number of spiral plate springs 162 may be set in a process of manufacturing the supporter for the display apparatus according to the exemplary embodiment of the present general inventive concept, so that various sizes of the display main body may be supported in the supporter 100*a*. Thus, since one kind of spiral plate spring 162 may be employed for supporting various sizes of the display main body 110, components are used in common, thereby reducing the manufacturing costs.

In the supporter 100*a* according to the exemplary embodiment of the present general inventive concept, the spring supporter 253 includes the rotor friction part 163, but the present general inventive concept is not limited thereto. Alternatively, the spring friction part 154 of the embodiment of FIGS. 1-5 may be provided instead of the rotor friction part 163. In this case, effects can be similar to those of the present embodiment.

Figure 8:
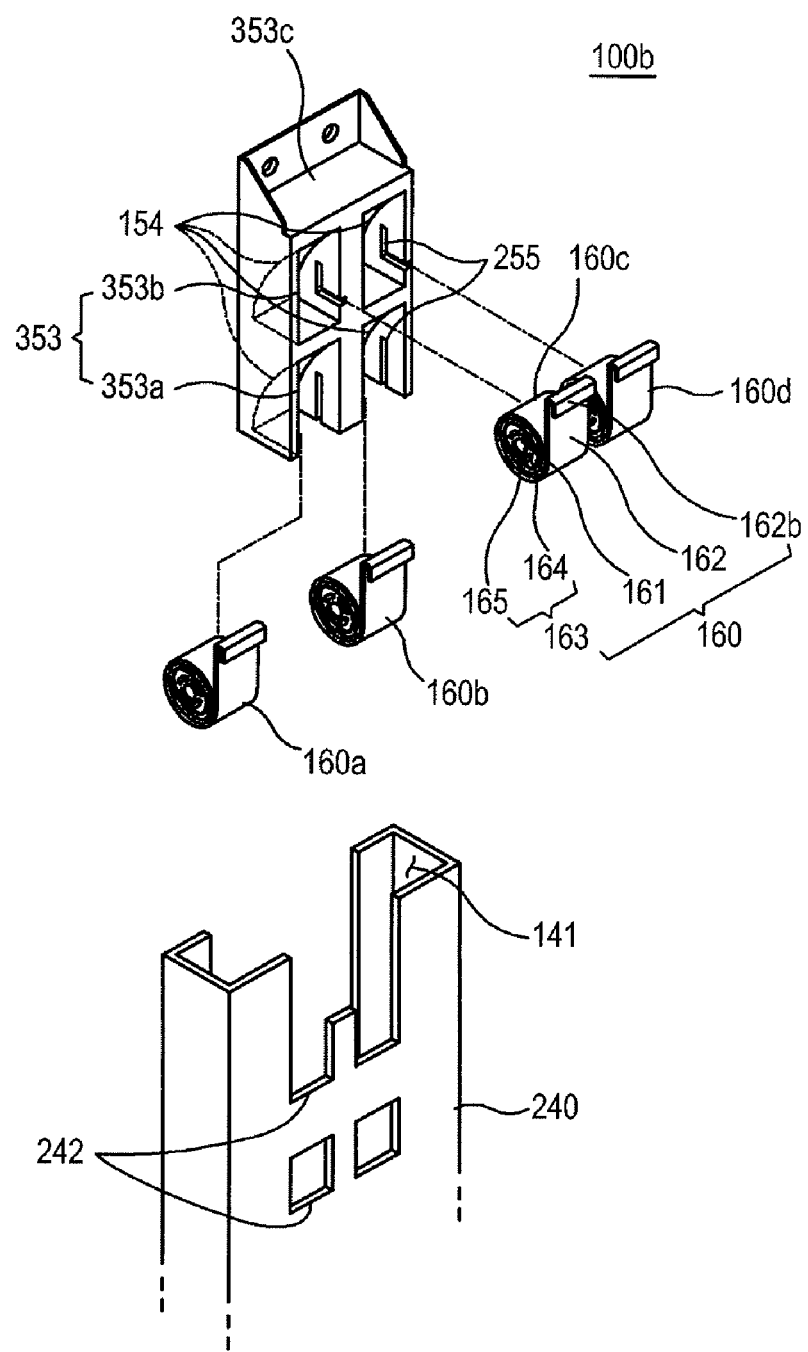
FIG. 8 is a perspective view illustrating an elastic unit and a spring supporting unit in a supporter usable with the display apparatus according to an exemplary embodiment of the present general inventive concept.
Figure 9:
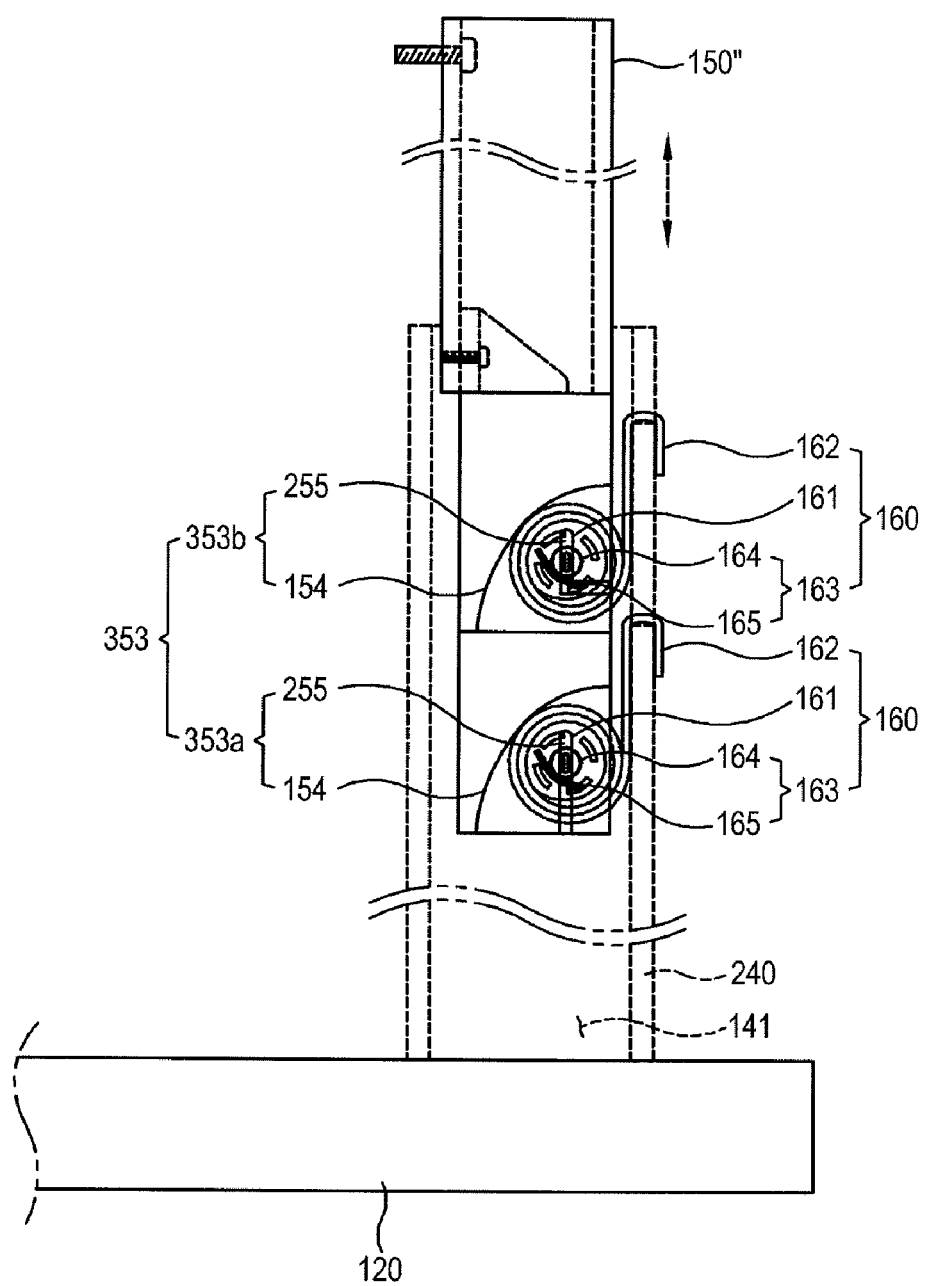
FIG. 9 is a cross-sectional view illustrating a moving up and down state of a vertical move unit of the supporter usable with the display apparatus of FIG. 8.

FIG. 8 is a perspective view illustrating an elastic unit 160 and a spring supporter 353 in a supporter 100*b* usable with an display apparatus according to an exemplary embodiment of the present general inventive concept, and FIG. 9 is a cross-sectional view illustrating a moving up and down state of a vertical moving member 150″ of the supporter 100*b* of FIG. 8.

The supporter 100*b* may be similar to the supporter 100*a* of FIGS. 5 and 7 and may include a spring supporter having not only the rotor friction part 163 but also the spring friction part 154 of the embodiment of FIGS. 1-5.

Since the supporter 100*b* of the present embodiment is similar to the embodiments of FIGS. 1-5 and FIGS. 6-7, detailed descriptions thereof will be omitted. Accordingly, a difference from the embodiment of FIGS. 6-7 will be described hereinafter.

The spring supporter 353 may include a lower spring supporter 353*a* and an upper spring supporter 353*b* each including the spring friction part 154 of the embodiment of FIGS. 1-5 as well as the rotor friction part 163 of the embodiment of FIGS. 6-7.

Like the embodiment of FIGS. 1-5, the spring friction part 154 of the present embodiment frictionally contacts an outer surface of the spiral plate spring 162. According to an exemplary embodiment of the present embodiment, the spring friction part 154 includes a spring friction surface 154*a* which is formed as an arc shape on an inner surface of the spring supporter 353 to correspond to an outer appearance of the spiral spring 162 of the elastic unit 160 such that the outer surface of the spiral plate spring 162 is in contact with the spring friction surface 154*a* of the spring friction part 154. However, the spring friction part 154 is not limited to the above description, and may have various shapes such as a projection or the like in order to frictionally contact the outer surface of the spiral plate spring 162.

With the above described configuration, the supporter 100*b* usable with the display apparatus according to the exemplary embodiment of the present general inventive concept is configured to use three or more spiral plate springs 16, and includes both the rotor friction part 163 and the spring friction part 154. As compared with the embodiments of FIGS. 1-5 and FIGS. 6-7, the supporter 100*b* according to present embodiment may support more various sizes or weights of the display main body. When each spiral plate spring 162 has an elasticity of about 2 kgf and each of the rotor friction part 163 and the spring friction part 154 has a friction of about 0.25 kgf, if one spiral plate spring 162 is mounted to the spring supporter 353, the supporter 100*b* usable with the display apparatus is capable of supporting the display main body 110 having a weight of about 1.5 kgf through 2.5 kgf. If four spiral plate springs 162 are mounted to the spring supporter 353, the total elasticity of four spiral plate springs 162 is about 8 kgf and the total friction of the rotor friction part 163 is about 2 kgf, so that the supporter for the display apparatus is capable of supporting the display main body 110 having a weight of about 6 kgf through 10 kgf.

As the number of spiral plate springs 162 supported in the spring supporter 353 is changeable in a range of 1 through 4, the weight of the display main body 110 to be supported may be changeable in a range of about 1.5 kgf through 10 kgf.

Further, in the supporter 100*b* usable with the display apparatus according to the embodiment of the present general inventive concept, the friction based on the rotor friction part 163 becomes higher as the number of spiral plate springs 162 to be supported increases, thereby stably supporting the display main body 110. As described above in the embodiment of FIGS. 1-5, if the friction caused by the rotor friction part 163 is too great, the spiral plate spring 162 may not smoothly rotate when the vertical moving member 150 moves up and down. Accordingly, even if the display main body 110 is so heavy, the plurality of spiral plate springs 162 and the plurality of friction parts causing proper friction are used to support the display main body 110.

According to the present general inventive concept, the spring supporter 353 may include the first number of the spring friction parts 154, and the elastic unit 160 may include the second number of elastic units 160*a*, 160*b*, 160*c*, and 160*d*. According to a weight of the display main body 110 and one or more frictions of the elastic unit 160 with the vertical moving member 150″, the first number of the spring friction parts 154 and the second number of the elastic units 160 (160*a*, 160*b*, 160*c*, and 160*d*) may vary to correspond to the weight and the friction, so that a user can move the vertical moving member 150″ up and down in the moving direction with a minimum required force, and the vertical moving member 150‴ can maintain a stationary state after the moving state. For example, the first number may be three or four, and the second number may be one, two, three, or four. That is, when three of the spring friction parts 154 may be provided in the supporter body 353*c* of the spring supporter 353, or two elastic units 160 may be disposed in corresponding ones of the three spring friction parts 154. It is also possible that the three elastic units 160 may be disposed in corresponding ones of the three spring friction parts 154.

According to the present general inventive concept, it is also possible that a plurality of the elastic units 160 may be different from each other in size, elasticity, and/or friction with the vertical moving member 150″. It is also possible that a plurality of spring friction parts 154 may be different from each other in size and shape to correspond to the different elastic units 160.

As described above, according to an exemplary embodiment of the present general inventive concept, the display main body is stably supported even though the load involving the display main body increases.

Further, the tolerance for supporting a load involving the display main body is extended, so that it is easy to change the size and the weight of the display main body.

Also, components needed for increasing friction in the supporter are minimized in number or shared in common, thereby reducing the manufacturing costs.

Although a few exemplary embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. A supporter usable with a display apparatus, comprising:
    a base;
    a vertical moving member coupled to a display main body;
    a guide frame coupled to the base to support the vertical moving member to slide up and down with respect to the base;
    a spring rotor supported in the vertical moving member to rotate about a rotational axis transverse to a moving direction of the vertical moving member and to move up and down along with the vertical moving member with respect to the base;
    a spiral plate spring comprising an inside end part coupled to the spring rotor, a middle part wound around the spring rotor, and an outside end part coupled to the guide frame to elastically resist a downward movement of the vertical moving member;
    a spring friction part to frictionally contact the spiral plate spring to resist a rotational movement of the spiral plate spring; and
    a rotor friction part to frictionally contact the spring rotor to resist a rotational movement of the spring rotor.

2. The supporter of claim 1, wherein the spring friction part is provided in the vertical moving member and has an arc-shaped friction surface to frictionally contact an outer surface of the spiral plate spring.

3. The supporter of claim 1, wherein the rotor friction part comprises:
    a rotor shaft having a first part coupled to the spring rotor along the rotational axis of the spring rotor to rotate relative to the spring rotor, and a second part coupled to the vertical moving member and prevented from rotating; and
    a friction spring interposed between the spring rotor and the rotor shaft to elastically contact the rotor shaft.

4. The supporter of claim 3, wherein the vertical moving member comprises a guide part to slidably guide the second part of the rotor shaft to make the spiral plate spring contact the spring friction part.

5. The supporter of claim 4, wherein:
    the second part of the rotor shaft comprises a sliding projection protruding from the first part of the rotor shaft and slidably coupled to the guide part, and
    the guide part is lengthwise formed on an inner surface of the vertical moving member along a moving direction of the rotor shaft and accommodates and guides the sliding projection to move up and down.

6. The supporter of claim 1, wherein at least one of the spring friction part and the rotor friction part generate a friction in a range of 0.2 kgf through 0.3 kgf when the vertical moving member moves up and down.

7. The supporter according to claim 1, wherein the spiral plate spring has elasticity in a range of 1 kgf through 7 kgf.

8. A supporter usable with a display apparatus, comprising:
    a base;
    a vertical move supporting unit provided between a display main body and the base to support the display main body to slide up and down with respect to the base;
    a spiral plate spring to elastically control the display main body to move up with respect to the base;
    a spring rotor coupled to an inside of the spiral plate spring such that the spiral plate spring is wound around the spring rotor;
    a rotor friction part coupled within the spring rotor to resist rotation of the spring roller; and
    a spring supporter to support the spiral plate spring and the spring otor and detachably coupled to the vertical move supporting unit.

9. The supporter of claim 8, wherein the vertical move supporting unit comprises:
    a vertical moving member having a first side coupled to the display main body and a second side detachably coupled with the spring supporter; and
    a guide frame coupled to the base to support the vertical moving member to slide up and down.

10. The supporter of claim 9, wherein the vertical moving member is made of a metal material, and the spring supporter is made of a plastic material.

11. The supporter of claim 8, wherein the rotor friction part frictionally contacts the spring rotor to resist a rotation of the spring rotor.

12. The supporter of claim 11, wherein the rotor friction part comprises:
    a rotor shaft having a first part coupled to the spring rotor along a rotational axis of the spring rotor to rotate relative to the spring rotor, and a second part coupled to the vertical moving member and prevented from rotating; and
    a friction spring interposed between the spring rotor and the rotor shaft to elastically contact the rotor shaft.

13. The supporter of claim 12, wherein the spring supporter comprises a guide part to slidably guide the second part of the rotor shaft to make the spiral plate spring contact the spring supporter.

14. The supporter of claim 13, wherein:
    the second part of the rotor shaft comprises a sliding projection protruding from the first part of the rotor shaft and slidably coupled to the guide part; and
    the guide part is lengthwise formed on an inner surface of the vertical moving member along a moving direction of the rotor shaft and accommodates and guides the sliding projection to move up and down.

15. The supporter of claim 11, wherein the rotor friction part generates a friction is in a range of 0.2 kgf through 0.3 kgf.

16. The supporter of claim 8, further comprising:
    a spring friction part to frictionally contact the spiral plate spring and to resist a rotational movement of the spiral plate spring.

17. The supporter of claim 16, wherein the spring friction part is provided in the spring supporter and having an arc-shaped friction surface to frictionally contact an outer surface of the spiral plate spring.

18. The supporter of claim 16, wherein the spring friction part generates a friction in a range of 0.2 kgf through 0.3 kgf.

19. The supporter of claim 8, wherein the spring supporter selectively supports at least three spiral plate springs.

20. The supporter of claim 19, wherein the spring supporter comprises:
a lower spring supporter provided in a lower region of he vertical move supporting unit to support the pair of spiral plate springs; and
an upper spring supporter placed over the lower spring supporter to support the pair of spiral plate springs.

21. The supporter of claim 11, further comprising:
a spring friction part to frictionally contact the spiral plate spring and to resist a rotational movement of the spiral plate spring.

22. The supporter of claim 21, wherein the spring friction part is provided in the spring supporter and having an arc-shaped friction surface to frictionally contact an outer surface of the spiral plate spring.

23. A supporter usable with a display apparatus, comprising:
a base;
a vertical moving member coupled to a display main body;
a guide frame coupled to the base to support the vertical moving member to move with respect to the base; and
an elastic unit connected between the vertical moving member and the guide frame, the elastic unit comprising:
a spring including an inside end part and an outside end part coupled to the guide frame, and having elasticity, and
a spring friction part to generate friction with the spring to resist a rotational movement of the spring in order to maintain a position of the display main body with respect to the base.

24. The support of claim 23, wherein the elastic unit comprises:
a spring rotor supported in the vertical moving member and coupled to the inside end part to rotate about a rotational axis transverse to a moving direction of the vertical moving member and to move up and down along with the vertical moving member with respect to the base, and having one of the one or more frictional areas.

25. The support of claim 24, wherein the elastic unit comprises:
a rotor friction part to generate frictions with the spring rotor to resist a rotational movement of the spring rotor.

26. The support of claim 23, wherein the elastic unit comprises:
a spring including an inside end part and an outside end part coupled to the guide frame and the vertical moving member, respectively, and having the elasticity;
a spring rotor coupled to an inside of the spiral plate spring such that the spiral plate spring is wound around the spring rotor; and
a spring supporter formed on the vertical move supporting unit to support the spiral plate spring and the spring rotor and detachably coupled to the vertical move supporting unit.

27. The support of claim 23, wherein:
the vertical moving member comprises a first number of friction parts; and
the elastic unit comprises a second number of springs to be coupled between the guide frame and a corresponding one of the friction parts, so that one or more frictional areas are generated.

28. The support of claim 27, wherein the friction parts are different from each other in size or shape.

29. The support of claim 27, wherein the springs are different from each other in elasticity.

30. The support of claim 27, wherein the springs are differnt from each other in friction with the vertical moving member.

31. A supporter usable with a display apparatus, comprising:
a base;
a vertical moving member coupled to a display in body and having a first number of friction parts;
a guide frame coupled to the base to support the vertical moving member to move with respect to the base; and
an elastic unit connected between the vertical moving member and the guide frame, having elasticity and friction to maintain a position of the display main body with respect to the base, and having a second number of springs having elasticity and to be coupled between the guide frame and a corresponding one of the friction parts to generate friction,
wherein the first number is greater than the second number.

32. A supporter usable with a display apparatus, comprising:
a base;
a vertical moving member coupled to a display main body and having a plurality of friction parts;
a guide frame coupled to the base to support the vertical moving member to move with respect to the base; and
an elastic unit connected between the vertical moving member and the guide frame, having elasticity and one or more frictional areas to maintain a position of the display main body with respect to the base, and having a plurality of springs having elasticity and to be coupled between the guide frame and a corresponding one of the friction parts to generate friction at the one or more frictional areas,
wherein the at least one of the springs is different in elasticity from the other one of the springs.

* * * * *